(12) United States Patent
Matui

(10) Patent No.: US 6,473,470 B1
(45) Date of Patent: Oct. 29, 2002

(54) PHASE-LOCKED LOOP CIRCUITS FOR COMMUNICATION SYSTEM

(75) Inventor: Hitosi Matui, Tokyo (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/309,830

(22) Filed: May 11, 1999

(30) Foreign Application Priority Data

May 11, 1998 (JP) .............................. 10-145105

(51) Int. Cl.⁷ .............................. H03D 3/18; H03D 3/24
(52) U.S. Cl. .................. 375/340; 375/327; 375/371
(58) Field of Search ................ 375/341, 224, 375/227, 229, 233, 232, 262, 285, 316, 327, 340, 346, 362, 371, 375, 376; 714/794, 795; 331/41, 40, 44, 175, 177 R, 182, 183

(56) References Cited

U.S. PATENT DOCUMENTS 4,164,623 A * 8/1979 Hilbert et al.
5,525,935 A * 6/1996 Joo et al. ........................ 331/11

FOREIGN PATENT DOCUMENTS

| JP | 4-167646 | 6/1992 |
|---|---|---|
| JP | 4-503738 | 7/1992 |
| JP | 5-110617 | 4/1993 |
| JP | 5-243883 | 9/1993 |
| JP | 7-058676 | 3/1995 |
| JP | 2520697 | 5/1996 |
| JP | 8-172463 | 7/1996 |
| JP | 9-35421 | * 2/1997 |
| JP | 10-327204 | 12/1998 |
| WO | 90/02445 | 3/1990 |
| WO | 91/17052 | 6/1995 |

OTHER PUBLICATIONS

Japanese Office Action issued Mar. 13, 2001 in a related application with English translation of relevent portions.
IEEE Transactions on Communications, May, 1989, vol. 37, No. 5(ISSN 0090-6778), IEEE Communications Society.

* cited by examiner

Primary Examiner—Jean Corrielus
(74) Attorney, Agent, or Firm—Dickstein, Shapiro, Morin & Oshinsky, LLP.

(57) ABSTRACT

In a phase-locked loop circuit with a signal estimator such as MLSE or DDFSE for correctly detecting and correcting a phase deviation, the phase deviation is held within a predetermined value by amplitude limiting a phase deviation signal obtained from a received signal and a replica signal. Thus, the phase deviation signal is free from a large error irrespective of generation of an estimation error in the MLSE or DDFSE.

5 Claims, 11 Drawing Sheets

PHASE-LOCKED LOOP CIRCUITS FOR COMMUNICATION SYSTEM

BACKGROUND OF THE INVENTION

The present invention relates to phase-locked loop circuits for communication system of digital data transmission in which a phase deviation is detected and removed from a received signal having been phase deviated by phase errors generated due to the frequency off-set or signal rise in burst transmission, and more particularly to a phase-locked loop circuit, which can be used together with a signal estimator for correctly detecting and correcting a phase deviation in even a received signal which has been extremely deteriorated due to a transmission line distortion, and can also ensure stable operation even in such a bad receiving circumstances that the signal estimator makes erroneous signal estimation.

A phase-locked loop of the pertaining kind, is disclosed in, for instance, Japanese Patent Application No. 9-135454 prior to the present application. In addition, as an adaptive maximum likelihood sequence estimator for correcting the phase variation over a wide frequency off-set range, has been proposed one, which comprises a phase rotator for rotating the phase of a received signal to correct phase variations of the received signal, a Viterbi algorithm processor, a transmission line estimator, and a phase estimator for estimating the phase and providing the estimated phase value to the phase rotator, and in which the phase variation is compensated by the phase estimator and the phase rotator, while at the same time an integrating means in loop filter corrects the phase variation due to frequency off-set or phase jitter using a second-degree phase-locked loop, thereby compensating constant phase rotation due to the frequency off-set.

FIG. 16 shows an example of the construction of a prior art phase estimator with a phase-locked loop. Referring to the Figure, a DDFSE (delayed decision feedback sequence estimator) 303 estimates a transmitted signal series from the received signal which has been distorted. A replica generator 305 generates a replica of the received signal through convolution of a preliminarily obtained transmission line impulse response and a series signal estimated by the DDFSE 303. In this prior art signal estimator, a phase deviation signal for phase control in phase-locked loop computation is generated by comparing the phases of a replica signal obtained from an estimation signal of the DDFSE 303 and the received signal. Thus, it is possible to obtain highly accurate phase error compensation even with a received signal containing a large transmission line distortion.

A delaying element 304 delays a received signal to make up for a delay generated in the DDFSE 303. It is thus possible to cause generation of the output signals of the replica generator 305 and the delaying element 304 at the same timing.

A phase detector 306 obtains a phase deviation between the output signals of the replica generator 305 and the delaying element 304. When a frequency off-set has been provided to the received signal at this time, the phase difference between the transmitted and received signals is varied with the lapse of time, and the phase deviation obtained in the phase detector 306 is also varied with the lapse of time. With a constant transmission line impulse response used for the computation, the replica generator 305 outputs a signal free from phase deviation unless an estimation error is generated in the DDFSE 303. However, the phase of the output of the delaying element 304 is changed instantaneously. Therefore, the phase detector 306 outputs a phase deviation between these signals.

The output signal of the phase detector 306 is bandwidth limited through a filter 307, and then inputted to a VCO 308. The output signal of the VCO 308 is supplied to a phase rotator 302 for phase rotation of the received signal. Control is thus provided in a direction of reducing a phase deviation appearing in the phase detector 306, and it is thus possible to absorb phase changes due to the frequency off-set or like cause.

The above prior art phase-locked loop circuit, however, has a problem that an estimation error generated during signal estimation in the DDFSE results in sudden deterioration of the phase tracking characteristic of the base-synchronized loop circuit. This is so because the generation of an estimation error in the DDFSE results in a wrong value of the replica signal itself which is generated by using the estimation signal, thus resulting in an extremely large phase deviation between the replica signal and the received signal.

More specifically, while in the absence of any estimation error in the DDFSE the phase deviation between the replica signal and the received signal is a very small value of 10 degrees or less, the generation of an estimation error results in the generation of a phase deviation of up to 180 degrees in the worst case. Therefore, with frequent generation of estimation errors in the DDFSE, the phase detector can not only correctly detect a phase deviation, but outputs a phase deviation signal of a greatly wrong value. In this case, the phase deviation of the signal inputted to the DDFSE is increased, causing the DDFSE to generate a further estimation error. In such a vicious circle, the phase deviation between the replica signal and the received signal is further increased, thus ultimately resulting in dispersion.

As a measure for preventing such unsteadiness, it is necessary to delay the response of the phase-locked loop, thus providing for difficult dispersion of the phase synchronization as a result of the provision of a wrong phase deviation signal. By delaying the response of the phase-locked loop, however, the intrinsic phase tracking capacity itself is reduced, thus narrowing the scope of application.

SUMMARY OF THE INVENTION

The present invention was made in view of the above problems, and it has an object of providing, in a system for estimating a received signal having received a great transmission line distortion in a DDFSE (delayed decision feedback sequence estimator) or an MLSE (maximum likelihood sequence estimator), a signal estimation circuit with a phase-locked loop, in which the phase-locked loop circuit can highly accurately and fast tracking and correct phase changes due to the frequency off-set or the like even in such a bad environment that the DDFSE or the MLSE may do wrong signal estimation.

According to an aspect of the present invention, there is provided a signal estimator comprising a phase-synchronized rotating means for rotating the phase of a received signal, a maximum likelihood sequence estimator for estimating a received signal, a replica generating means for generating a replica signal of an input signal to the maximum likelihood sequence estimator, a delaying means for causing delays of the received signal in the maximum likelihood sequence estimator and the replica generating means, a phase detecting means for detecting a phase difference between the signal from the delay means and the replica signal from the replica generating means, a low-pass filter and a voltage-controlled oscillating means, the phase rotating means rotating the phase of the received signal according to the output of the voltage-controlled oscillating means, wherein a limiter means is provided between the phase detecting means and the filter, the limiter means being operable to limit the output of the phase detecting means to amplitude limit a phase difference signal obtained from the received signal and the replica signal, thereby suppressing phase deviations to be within a predetermined value.

According to the present invention, the phase deviation is held within a predetermined value by amplitude limiting a phase deviation signal obtained from a received signal and a replica signal. Thus, the phase deviation signal is free from a large error irrespective of generation of an estimation error in the MLSE or DDFSE. The control of the phase-locked loop is thus stabilized, thus obtaining the phase tracking with less dispersion. Thus, even in a bad environment giving rise to an estimation error in the MLSE or DDFSE, it is possible to evade such bad cycles as to further deteriorate the estimation capacity of the MLSE or DDFSE due to capacity deterioration of the phase-locked loop.

According to another aspect of the present invention, there is provided a signal estimator comprising a phase-synchronized rotating means for rotating the phase of a received signal, a delayed decision feedback sequence estimator for estimating a received signal, a replica generating means for generating a replica signal of an input signal to the delayed decision feedback sequence estimator, a delaying means for causing delays of the received signal in the delayed decision feedback sequence estimator and the replica generating means, a phase detecting means for detecting a phase difference between the signal from the delay means and the replica signal from the replica generating means, a low-pass filter and a voltage-controlled oscillating means, the phase rotating means rotating the phase of the received signal according to the output of the voltage-controlled oscillating means, wherein a limiter means is provided between the phase detecting means and the filter, the limiter means being operable to limit the output of the phase detecting means to amplitude limit a phase difference signal obtained from the received signal and the replica signal, thereby suppressing phase deviations to be within a predetermined value.

The limiter means includes an overflow detecting means for detecting an overflow of the input signal, an underflow detecting means for detecting an underflow of the input signal, and a data correcting means for receiving the input signal and detection signals from the overflow and underflow detecting means; the data correcting means outputting a predetermined first value irrespective of the value of the input signal upon detection of an overflow by the overflow detecting means, and also directly outputting the input signal when neither an overflow nor an underflow is detected by the overflow or underflow detecting means and outputting a predetermined second value irrespective of the value of the input signal upon detection of an underflow by the underflow detecting means.

The phase detecting means includes two multiplying means for obtaining $r_x p_y$ and $r_y p_x$ with respect to the output ($r=r_x+jr_y$, $j^2=-1$) of the delay means and the output ($p=p_x+jp_y$) of the replica generating means, and an adding means for adding the product results of the two multiplying means.

According to other aspect of the present invention, there is provided a system for receiving, in digital communication, a received signal with the frequency off-set thereof having received distortion due to phase rotation and transmission line distortion, estimating the received signal by correcting the frequency offset to output the digital signal, a signal estimator with phase-locked loop comprising: a voltage-controlled oscillating means; a phase-rotating means for causing rotation of the phase of the received signal according to the phase of the output signal of the voltage-controlled oscillating means; a maximum likelihood series estimating means for estimating the received signal by receiving the output signal of the phase rotating means; a replica generating means for generating a replica signal of the input signal to the maximum likelihood series estimating means by receiving the estimation result; a delaying means for receiving the output signal of the phase rotating means and generating a delay corresponding to a delay time until the maximum likelihood series estimating means outputs the result of estimation; a phase detecting means for obtaining the phase difference between the output signal of the replica generating means and the output signal of the delaying means; a limiter for receiving the output signal of the phase detecting means and holding the output signal at a predetermined value by clipping the output signal when the amplitude of the output signal exceeds a predetermined range; and a filter for frequency band limiting the output signal of the limiter; the voltage-controlled oscillating means generating a sinusoidal wave at a frequency proportional to the output of the filter.

According to still other aspect of the present invention, there is provided a system for receiving, in digital communication, a received signal with the frequency off-set thereof having received distortion due to phase rotation and transmission line distortion, estimating the received signal by correcting the frequency offset to output the digital signal, a signal estimator with phase-locked loop comprising: a voltage-controlled oscillating means; a phase-rotating means for causing rotation of the phase of the received signal according to the phase of the output signal of the voltage-controlled oscillating means; a delay determination feedback series estimating means for estimating the received signal by receiving the output signal of the phase rotating means; a replica generating means for generating a replica signal of the input signal to the delay determination feedback series estimating means by receiving the estimation result; a delaying means for receiving the output signal of the phase rotating means and generating a delay corresponding to a delay time until the delay determination feedback series estimating means outputs the result of estimation; a phase detecting means for obtaining the phase difference between the output signal of the replica generating means and the output signal of the delaying means; a limiter for receiving the output signal of the phase detecting means and holding the output signal at a predetermined value by clipping the output signal when the amplitude of the output signal exceeds a predetermined range; and a filter for frequency band limiting the output signal of the limiter; the voltage-controlled oscillating means generating a sinusoidal wave at a frequency proportional to the output of the filter.

According to further aspect of the present invention, there is provided a signal estimator with a phase-locked loop comprising: an estimator for estimating a transmitted signal series from a received signal; a replica generator for generating a replica of the received signal through convolution of a preliminarily obtained transmission line impulse response and a series signal estimated by the estimator; a delaying element for delaying the received signal to make up for a delay generated in the estimator; a phase detector for obtaining a phase deviation between the output signals of the replica generator and the delaying element; a limiter for limiting the output of the phase detector to amplitude limit within a predetermined value; a filter for making bandwidth limitation of output signal of the limiter; a voltage-controlled oscillator for generating a signal of frequency controlled by the output of the filter; a phase rotator for making phase rotation of the received signal on the basis of the output of a voltage-controlled oscillator in a direction of reducing a phase deviation appearing in the phase detector.

The estimator is a delayed decision feedback sequence estimator or a maximum likelihood sequence estimator.

According to still further aspect of the present invention, there is provided a signal estimating method with a phase-locked loop comprising: estimating a transmitted signal series from a received signal; generating a replica of the received signal through convolution of a preliminarily obtained transmission line impulse response and a series estimated signal; delaying the received signal to make up for a delay generated in the estimation; obtaining a phase deviation between the replica signal and the delaying element; limiting the obtained phase deviation to amplitude limit within a predetermined value; making bandwidth limitation of the limited phase deviation; generating a signal of frequency controlled by the signal obtained by the bandwidth limitation; making phase rotation of the received signal on the basis of the frequency controlled signal in a direction of reducing a phase deviation appearing in the phase detector.

The estimation is a executed by delay determination feedback series estimation or a maximum likelihood series estimation.

Other objects and features will be clarified from the following description with reference to attached drawings.

PREFERRED EMBODIMENTS OF THE INVENTION

Preferred embodiments of the present invention will now be described with reference to the drawings.

Figure 1:
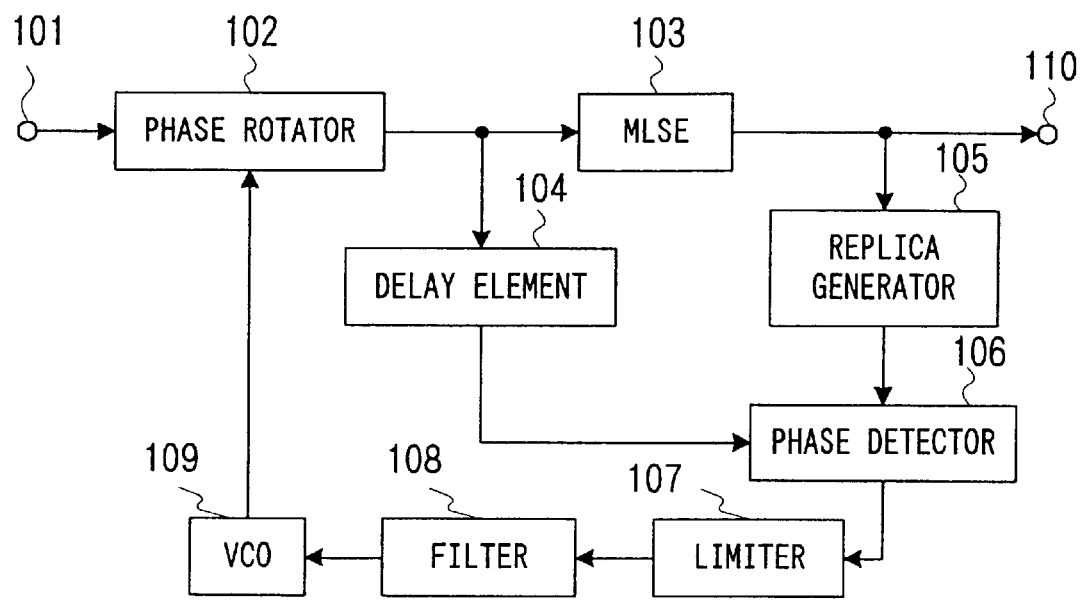
FIG. 1 is a block diagram showing a preferred embodiment of the present invention.

FIG. 1 is a block diagram showing a preferred embodiment of the present invention. Referring to the Figure, in this embodiment of the present invention a phase rotator 102 rotates the phase and corrects the phase deviation of a received two-dimensional signal, and supplies an output signal to an MLSE (maximum likelihood sequence estimator) 103. The MLSE 103 estimates the received signal, and the result of the estimation is outputted from an output terminal 110 and also supplied to a replica generator 105. The replica generator 105 generates a replica signal of the received signal through convolution of the received estimated signal series and a preliminarily obtained impulse response value of the transmission line. A delay element 104 delays the output of the phase rotator 102 by a time corresponding to a delay which is provided in the MLSE 103 and the replica generator 105. A phase detector 106 determines the phase deviation between the output signals of the delay element 104 and the replica generator 105, and supplies a phase deviation signal to a limiter 107. The limiter 107 limits the phase deviation signal to be within a certain level. A filter 108 filters the output signal of the limiter 107, and supplies a filtered signal output to a VCO 109. The VCO 109 supplies a phase correction signal of phase amount to the phase rotator 102.

The phase rotator 102 thus provides a received signal having been phase corrected according to the output signal. Through this loop computation, phase variations which are contained in the received signal and represented by the frequency off-set can be absorbed.

Figure 3:
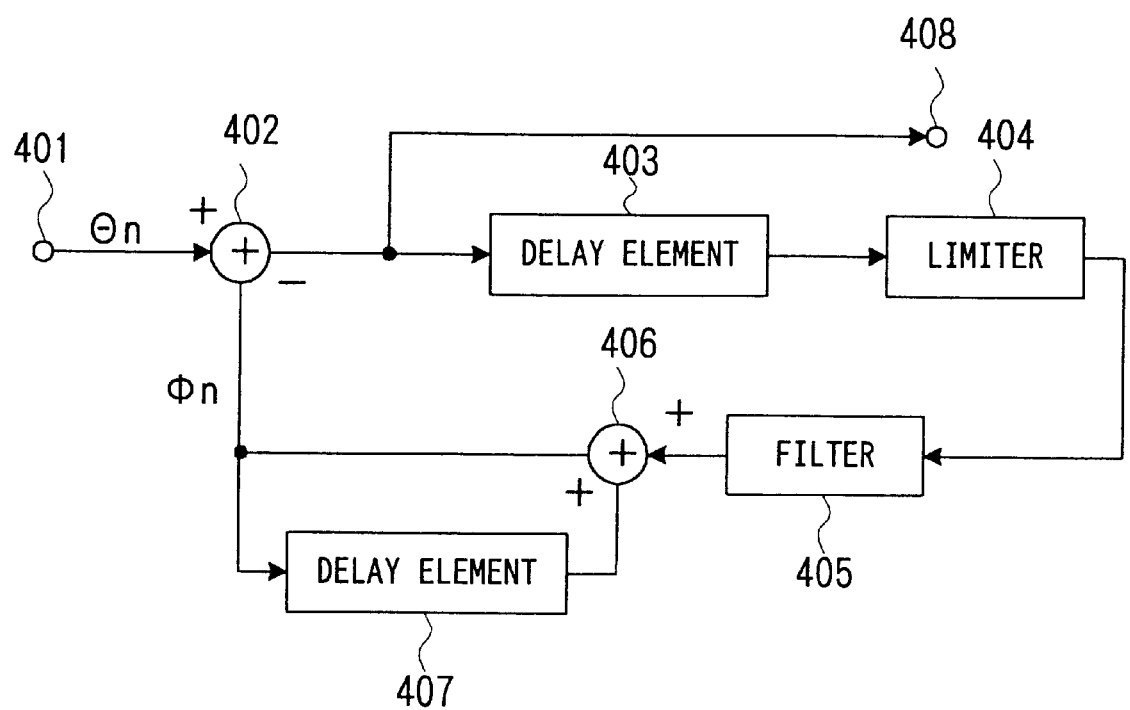
FIG. 3 is a block diagram showing the phase-locked loop circuit in the embodiment of the present invention.

The operation of the embodiment of the present invention will now be described. The system shown in FIG. 1 is considered to be of a construction as shown in FIG. 3 when only the phase component of the received signal is considered. The phase rotator 102 shown in FIG. 1 can be represented by an adder 402 in FIG. 3. The MLSE 103, the delay element 104, the replica generator 105 and the phase detector 106 can altogether be represented by a delay element 403. The VCO 108 can be represented by an integrator including a delay element 407 and an adder 406.

As shown, when only the phase component is considered, the system may be of the construction as shown, which is obtained by adding the delay element 403 and the limiter 404 to the conventional PLL circuit.

Figure 16:
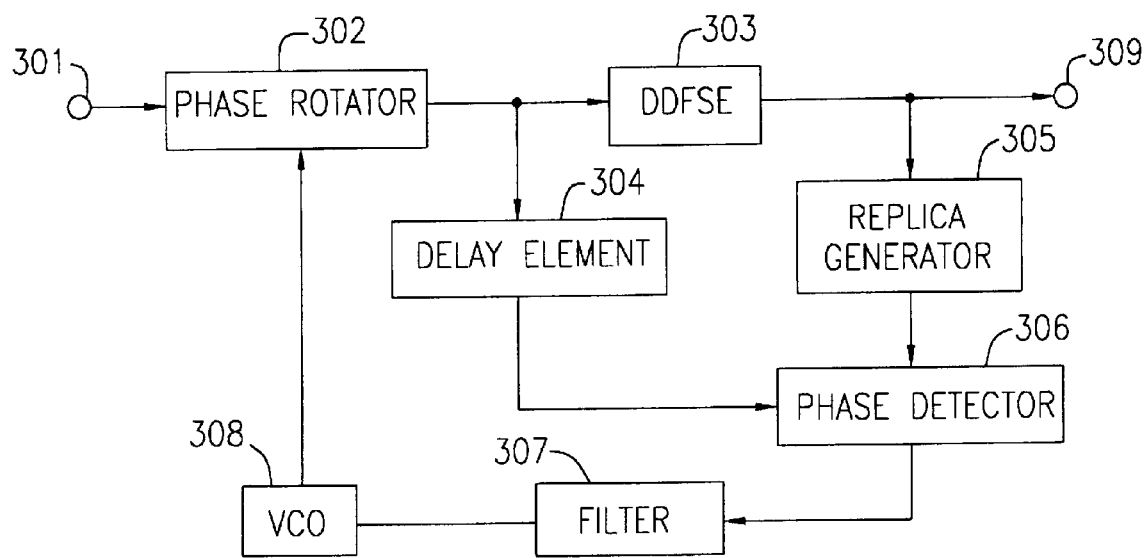
FIG. 16 is a block diagram of an example of the construction of a prior art phase estimator with a phase-locked loop.

The embodiment of the present invention is different from the prior art signal estimation circuit with a phase-locked loop shown in FIG. 16 in that it includes a limiter 404 shown in FIG. 3. In this embodiment, the phase error due to an estimation error in the MLSE can be reduced by the limiter 404.

The effects of the estimation error in the MLSE 103 in FIG. 1 on the phase signal output of the phase detector 106 will now be described.

The manner of error generation will now be described by using a Trelis transition chart shown in FIG. 4. This Trelis transition chart has four states and eight branches. An estimated signal is obtained with the Viterbi algorithm in a so-called trace-back process, in which a path having the minimum one of path metric values $S_{0,n}$ to $S_{3,n}$ shown in FIG. 4 is selected, and the state of a path traced back from the selected path by a certain number of symbols (for instance 10 symbols) is judged.

It is judged that paths leading form $S_{0,n}$ are as shown by solid lines when the estimation is right and that paths as shown by dashed lines are selected when the estimation is wrong. When the series shown by the dashed lines is selected as a result of the trace-back process, the MLSE 103 provides a wrong estimation result.

Figure 4:
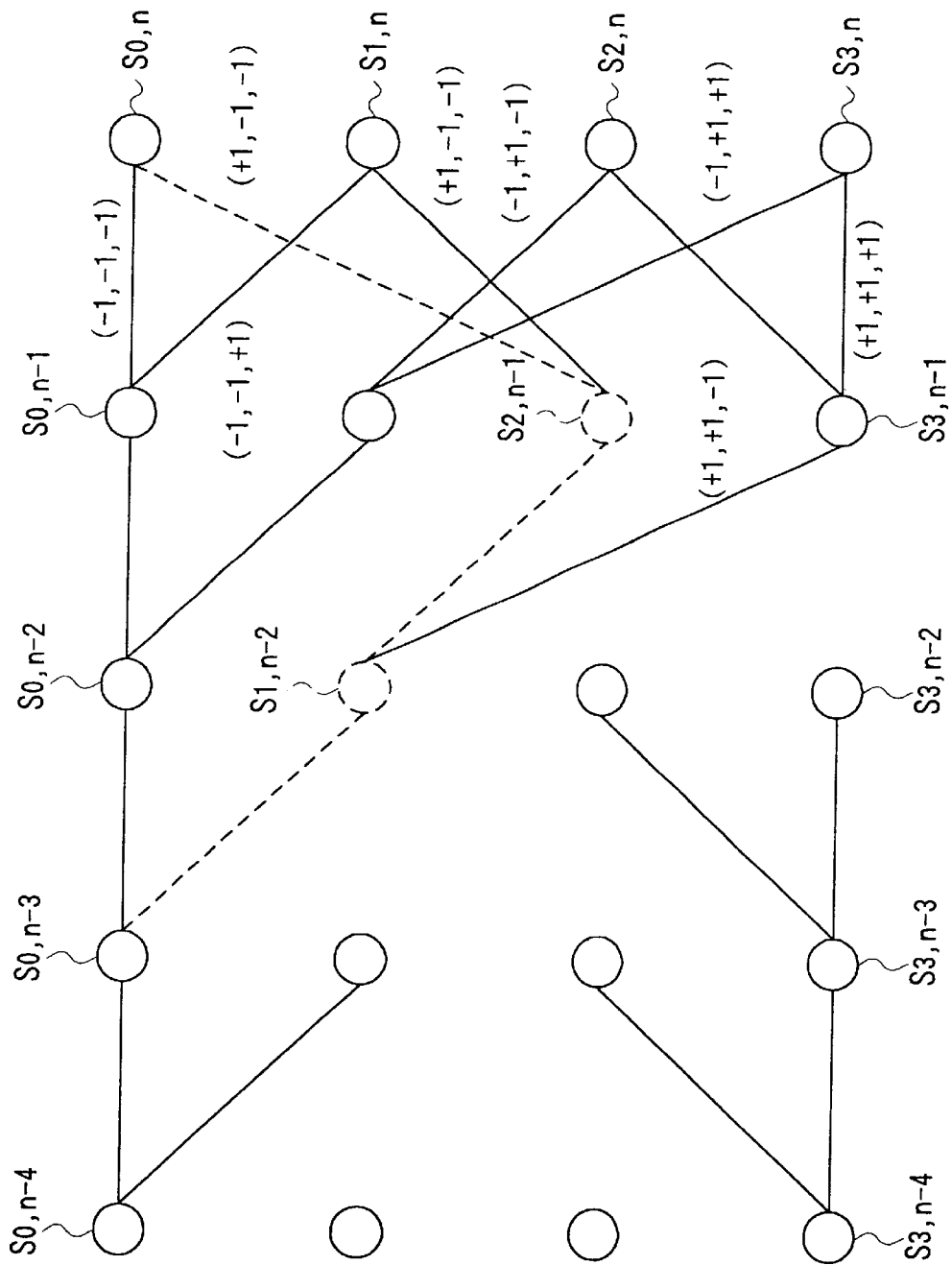
FIG. 4 shows a drawing for explaining the operation of MLSE in the embodiment of the present invention.

More specifically, in the three-dashed-line-symbol section in FIG. 4, solid line paths (−1,−1,−1), (−1,−1,−1) and (−1,−1.−1) are selected when the estimation is right. When the estimation contains an error, on the other hand, paths (+1,−1,−1), (−1,+1,−1) and (−1,−1,+1) are selected.

Since the result of estimation is supplied to the replica generator 105, the output thereof is greatly different form the intrinsic received signal. This means that the phase detector 106 detects a phase deviation of up to 180 degrees in the worst case.

Usually, in the absence of estimation error, the phase deviation is as small as 10 degrees or below. This means that the generation of an estimation error results in the output of an extremely large phase deviation signal. In the embodiment of the present invention, when the phase deviation is large, the limiter 107 limits the phase deviation to be within a certain value. With the phase deviation held within a certain value in this way, it is possible to suppress extremely large phase deviations due to estimation errors. It is thus possible to evade introduction of a large error component in the phase deviation signal, thus improving the stability of the phase-locked loop.

The embodiment of the present invention will be described in further details with reference to the drawings. Assuming that the transmission line impulse response has a spread of three symbols (h0, h1 and h2), a BPSK (binary phase shift keying) system will be described as a modulating system. For estimating a BPSK signal which has received a distortion in the transmission line, the MLSE 103 uses a 4-state Viterbi algorithm as shown in FIG. 4. In this case, the number of branches is 8.

The eight branch metric values can be obtained by using the equations (5) to (12). Here, $r_n$ represents the two-dimensional received signal corresponding to the n-th symbol. The path metric is obtained on the basis of the equations (1) to (4). The minimum path metric is obtained on the basis of the equation (13), and through the trace-back from the path having the minimum metric the MLSE 103 provides the result of estimation to the output terminal 109.

Figure 5:
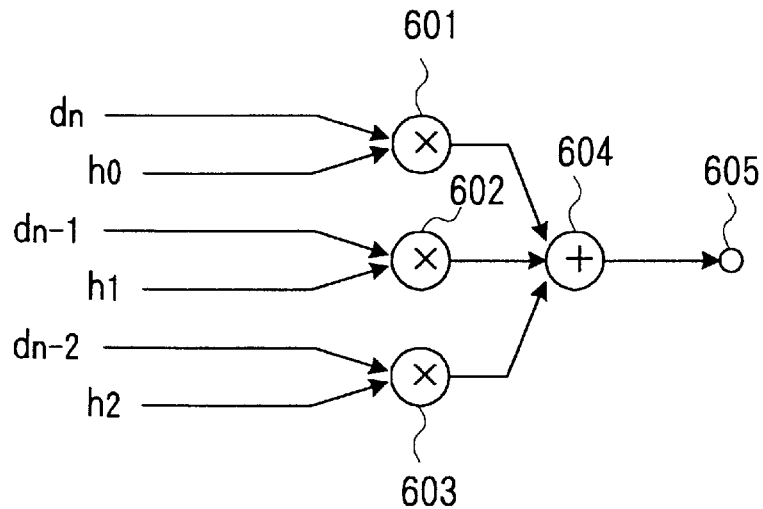
FIG. 5 is a block diagram showing an example of the construction of the replica generator in the embodiment of the present invention.

FIG. 5 shows an example of the construction of the replica generator 105. The replica signal is obtained through convolution of the result of estimation and the impulse response values. More specifically, the replica signal is obtained from the estimated values $d_n$ to $(d_{n-2})$ of the n-th to (n−2)-th symbols and the impulse response values ($h_0$ to $h_2$).

The delay element 104 delays the received signal by a time corresponding to the delay provided in the part of the circuit constituted by the MLSE 103 and the replica generator 105. The delay element 104 can be realized by a plurality of series-connected resistors.

Figure 6:
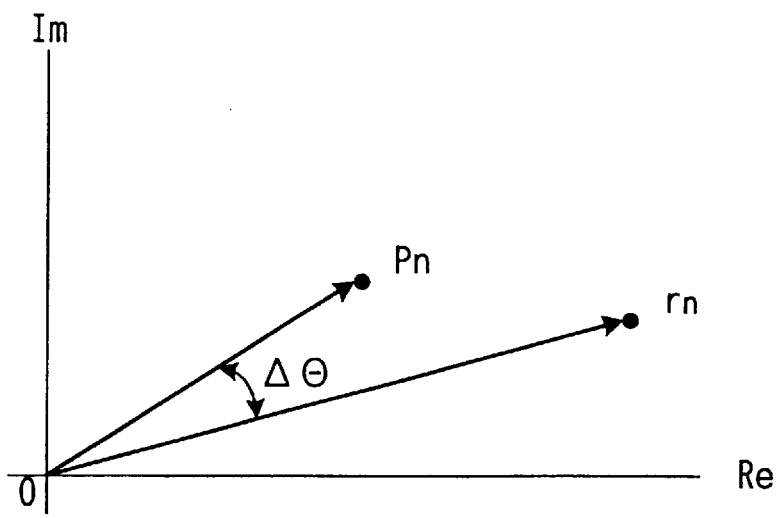
FIG. 6 is a drawing for explaining the phase deviation Δθ between the received signal and the replica signal with no generated estimation error from MLSE.
Figure 7:
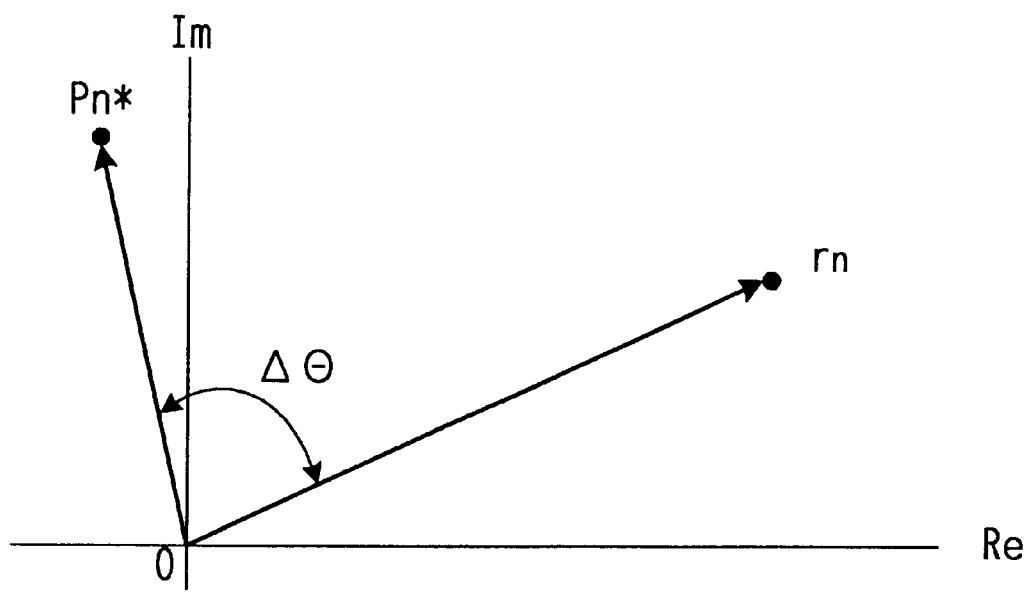
FIG. 7 is a drawing for explaining the phase deviation Δθ between the received signal and the replica signal with generated estimation error from MLSE.

The phase detector 106 determines the phase deviation between the received signal $r_n$ and the replica signal $p_n$. FIG. 6 shows the phase deviation $\Delta\theta$ in a complex-valued plane when the two-dimensional signals $r_n$ and $p_n$ are represented by complex numbers. When the result of estimation in the MLSE 103 is right, the replica signal $p_n$ is substantially the same as the received signal $r_n$. In this case, the phase deviation $\Delta\theta$ is thus small. When the result of estimation in the MLSE 103 contains an error, on the other hand, as shown in FIG. 7, the replica signal $p_n^*$ (* representing complex conjugate) is greatly different from the received signal $r_n$, thus resulting in an extremely large phase deviation.

Figure 8:
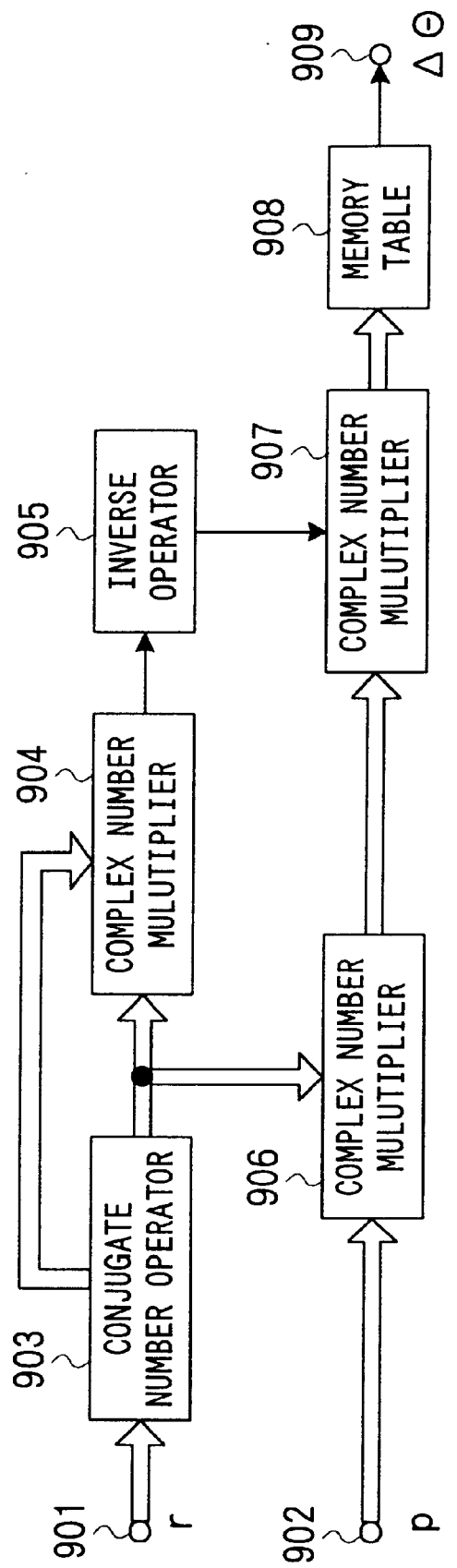
FIG. 8 is a block diagram showing an example of the construction of the phase detector in the embodiment of the present invention.

FIG. 8 shows an example of the construction of the phase detector 106. The phase detector 106 determines the phase difference $\Delta\theta$ between the received signal $r_n$ and the replica signal $p_n$ as follows. Representing the received and replica signals by the equations (14) and (15), respectively, the phase difference is obtained by computation with the equation (16).

The received signal r is converted to the conjugate number signal in a conjugate number operator 903. A complex number multiplier 904 multiplies the conjugate complex number of the received signal and the received signal to produce a power level of the received signal. An inverse operator 905 determines an inverse of the received signal power level. A complex number multiplier 906 multiples the conjugate complex number of the received signal and the complex number of the replica signal. Another complex number multiplier 907 multiplies the resultant product signal and the inversion of the received signal. This result constitutes the right side of the equation (16).

The phase difference $\Delta\theta$ may be obtained by using a memory table 908. Specifically the right side of the equation (16) represents an address in the memory table 908, and the output data corresponding to this address is $\Delta\theta$.

It is possible to accurately compute the phase deviation with the circuit construction shown in the block diagram of FIG. 8. However, the circuit is adapted to perform multiplification and inversion and uses a memory table, and its scale is thus increased.

As a system for avoiding this, the approximation of the formula (17) can be used so long as $\Delta\theta$ is sufficiently small, and it is thus possible to obtain the phase deviation using the formula (18). In the formula (18), $I_m$ represents an imaginary part.

In another aspect, when the amplitude of the received signal is small, the effects of noise are considerable, leading to a high possibility of error of the phase difference signal. In view of this point, when the received signal amplitude is small, the phase difference signal is multiplied by the power level of the received signal. Also, when the received signal amplitude is small, the response of the phase-locked loop is slow.

Figure 9:
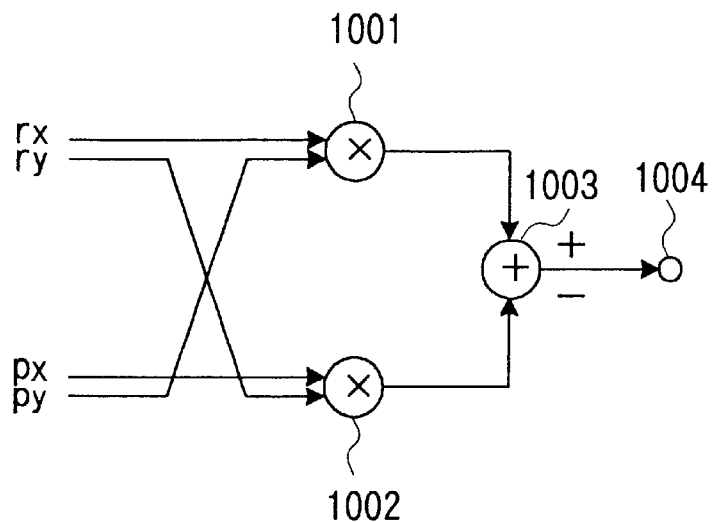
FIG. 9 is a block diagram showing an example of the construction of the phase detecting circuit in the embodiment of the present invention.

A circuit based on the concepts is shown in the block diagram of FIG. 9. This circuit permits approximately detecting the phase deviation by merely executing the computation of the equation (19). The circuit can be realized with only two multipliers 1001 and 1002 for obtaining the products of multipification of $r_x$ and $p_y$ and also of $r_y$ and $p_x$ as $r=r_x+jr_y$ and $p=p_y+jp_y$ ($j^2=-1$) and an adder 1003 for generating the sum of these products. It will be understood that Δθ is proportional to $r_x p_y + r_y p_x$ and is approximated by its division by the square of the amplitude of r.

Figure 10:
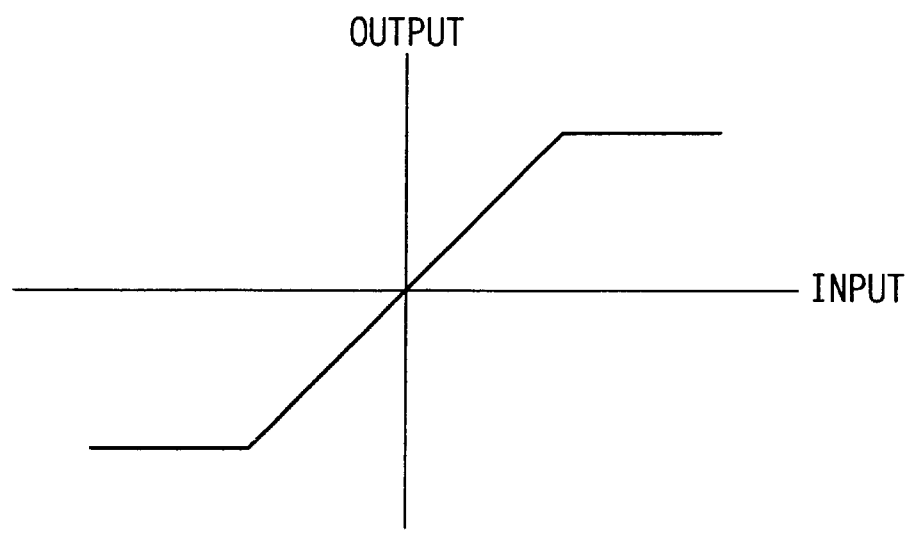
FIG. 10 is a drawing showing the input-output characteristic of the limiter in the embodiment of the present invention.

FIG. 10 is a view showing the input-output characteristic of the limiter 107. As shown, in the limiter 107 the output signal is proportional to the input signal up to a certain level thereof, and is settled at a constant level when this input signal level is exceeded.

Figure 11:
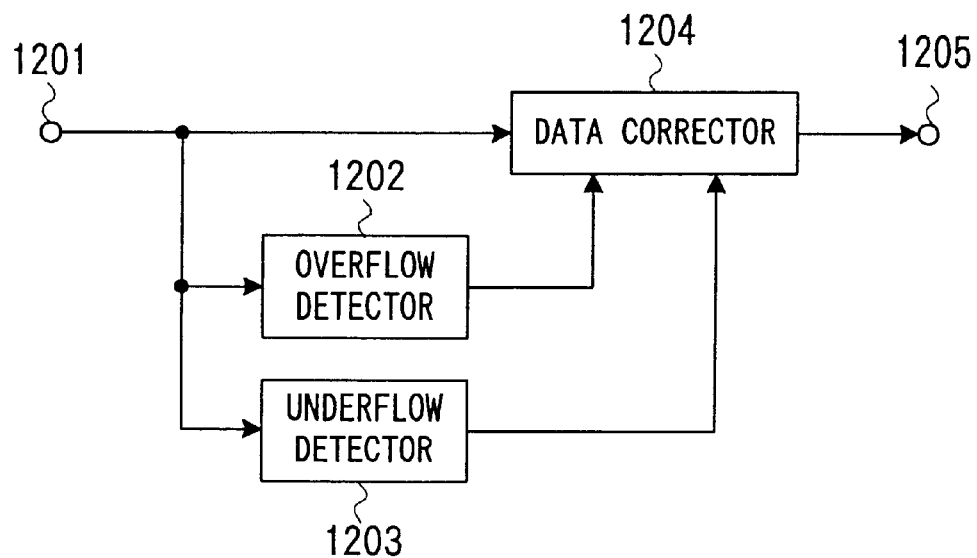
FIG. 11 is a block diagram showing an example of the construction of the limiter in the embodiment of the present invention.

FIG. 11 shows an example of the construction of the limiter 107. As shown, the limiter 107 includes an overflow detector 1202, an underflow detector 1203 and a data corrector 1204. It is assumed that an 8-bit digital signal which can take values of −128 to +127 is inputted from an input terminal 1201 and is limited when it is −16 or below or +16 or above. When the input signal value is in a range of −15 to +15, it is passed through the data corrector 1204 without any correction. When the input signal is +16 or above, the overflow detector 1202 detects this, and supplies an overflow detection signal to the data corrector 1204. In response to receipt of this overflow detection signal, the data corrector 1204 provides a value of +15 irrespective of the value of the input signal from the input terminal 1201.

When the input signal value is −16 or below, the underflow detector 1203 detects this, and supplies an underflow detection signal to the data corrector 1204. In response to receipt of the underflow detection signal, the data corrector 1204 provides a value of −15 irrespective of the value of the input signal from the input terminal 1201. By the operation as described, the limiter 107 directly passes the phase deviation signal which is intrinsically necessary for the phase-locked loop computation, while limiting a relatively large amplitude phase deviation signal generated due to an estimation error, thus improving the stability of the phase-locked loop computation.

Figure 12:
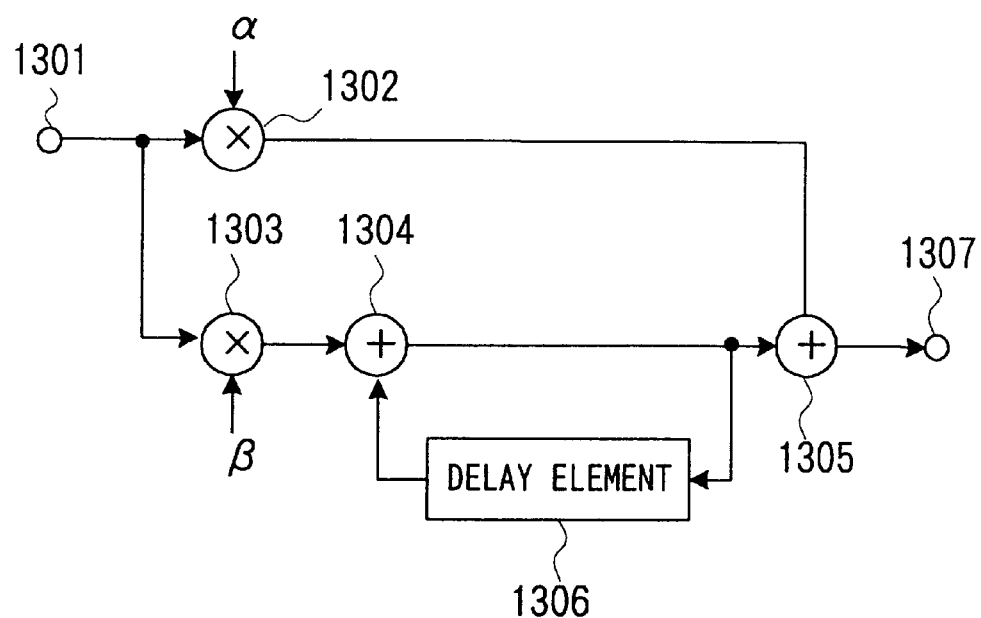
FIG. 12 is a block diagram showing an example of the construction of the second-degree filter in the embodiment of the present invention.

The output of the limiter 107 is supplied to the filter 108. The response of the phase-locked loop is determined by the characteristic of the limiter 108. As a typical second-degree filter may be used one, which has a transfer function given by the equation (20) and has a construction as shown in FIG. 12. The attenuation coefficient and the proper oscillating frequency of the loop characteristic may be selected by varying the values of filter coefficients α and β.

Figure 13:
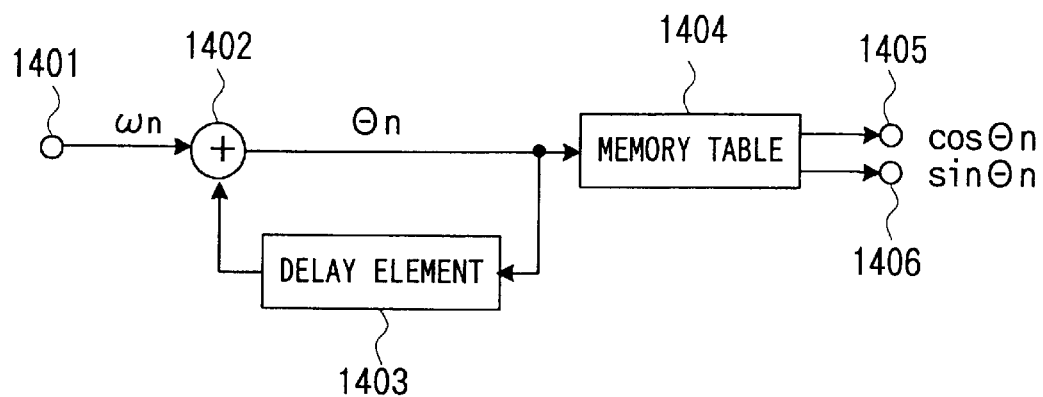
FIG. 13 is a block diagram showing an example of the construction of the VCO in the embodiment of the present invention.

FIG. 13 shows an example of the construction of the VCO 109 as a digital circuit. Referring to the Figure, an adder 1402 and a delay element 1403 constitute an integrator for converting an inputted frequency component to a phase component. For obtaining complex number, a sine and a cosine component are obtained by a memory table 1404. Thus, when the input signal from the input terminal 1401 is zero, certain constant values are continuously provided from output terminals 1405 and 1406. When a positive or negative value is continuously inputted as the input signal from the input terminal 1401, two-dimensional sine waves with the phases thereof rotated at a constant angular velocity in the positive or negative direction are provided from the output terminals 1405 and 1406. The output signal of the VCO 109 is inputted to the phase rotator 102, which phase rotates the received signal through computation based on the equation (21).

Figure 14:
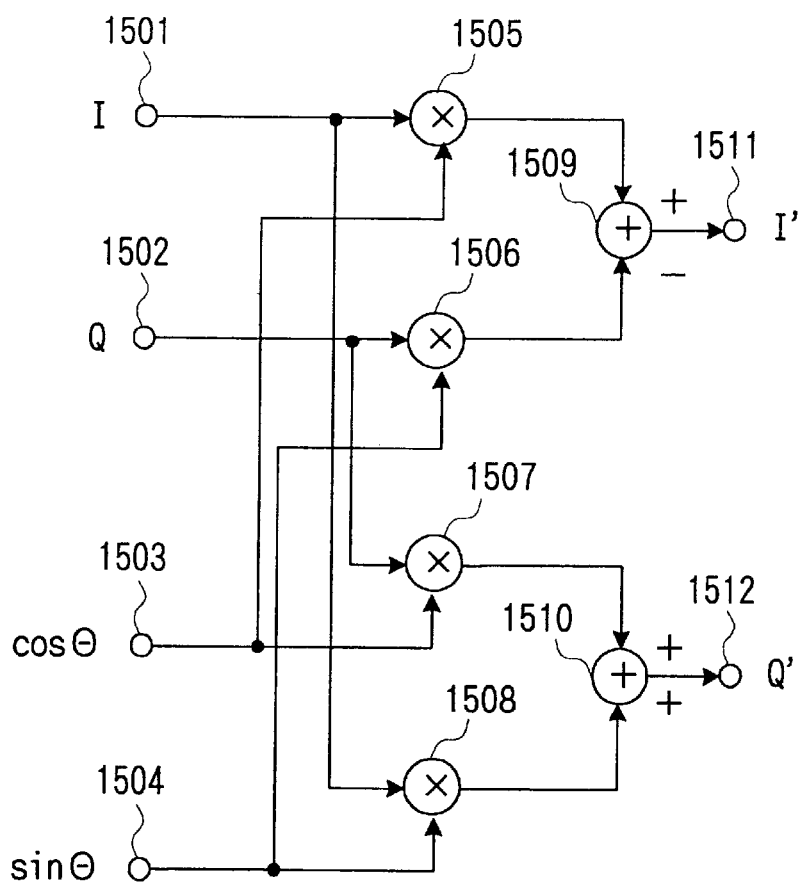
FIG. 14 is a block diagram showing an example of the construction of the phase rotator in the embodiment of the present invention.

FIG. 14 is a view showing an example of the construction of the phase rotator 102. two-dimensional I and Q signals inputted from input terminals 1501 and 1502 are phase rotated by angle θ according to two-dimensional sinusoidal waves cos θ and sin θ outputted from the VCO 109. The construction shown in FIG. 14 is based on the sample principles as those of computation based on coordinates rotation in two-dimensional coordinates. More specifically, multipliers 1505, 1059, 1507 and 1508, a subtracter, and an adder 1510 execute computations based on the equation (21), I'=I cos θ−Q sin θ and Q'=I sin θ+Q cos θ.

With the construction as described above, the phase detector 106 detects a phase variation component, if any, contained in the received signal, permitting the correction of the received signal for the phase variation component according to the phase variation. Thus, a signal containing a reduced phase variation component is inputted to the MLSE 103, and it is thus possible to make substantially the same signal estimation as when no phase variation component is present.

In addition, the limiter 107 amplitude limits a large amplitude noise component, if any, outputted from the phase detector 106 due to generation of an estimation error in the MLSE 103. It is thus possible to evade such an unstable operation as resulting in the dispersion of the phase-locked loop.

A different embodiment of the present invention will now be described. In the signal estimation, the present invention can be realized by using a DDFSE as well as MLSE.

Figure 2:
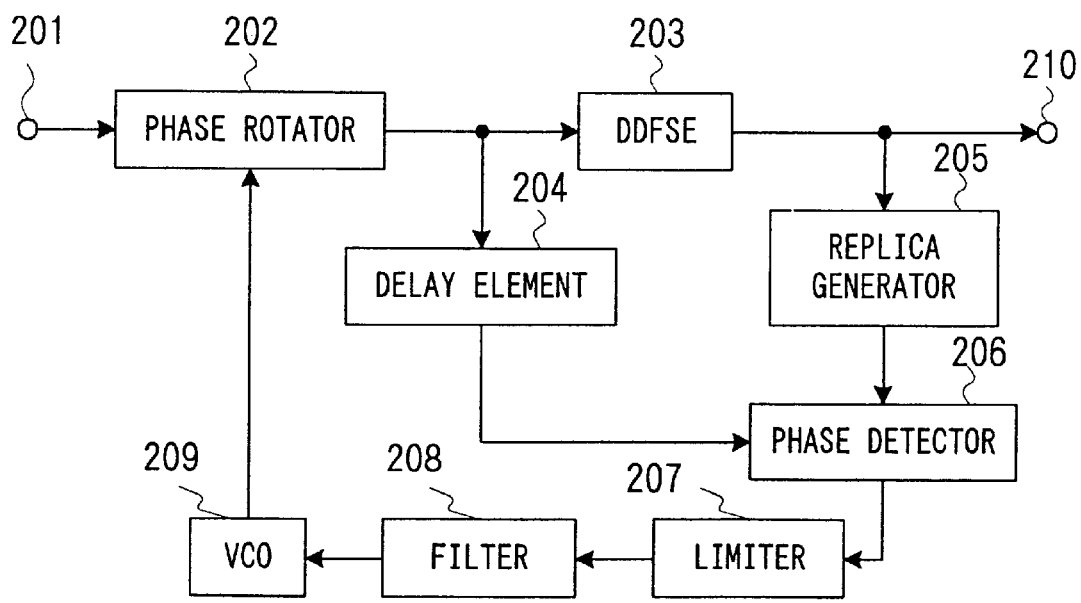
FIG. 2 is a block diagram showing a second embodiment of the present invention.
Figure 15:
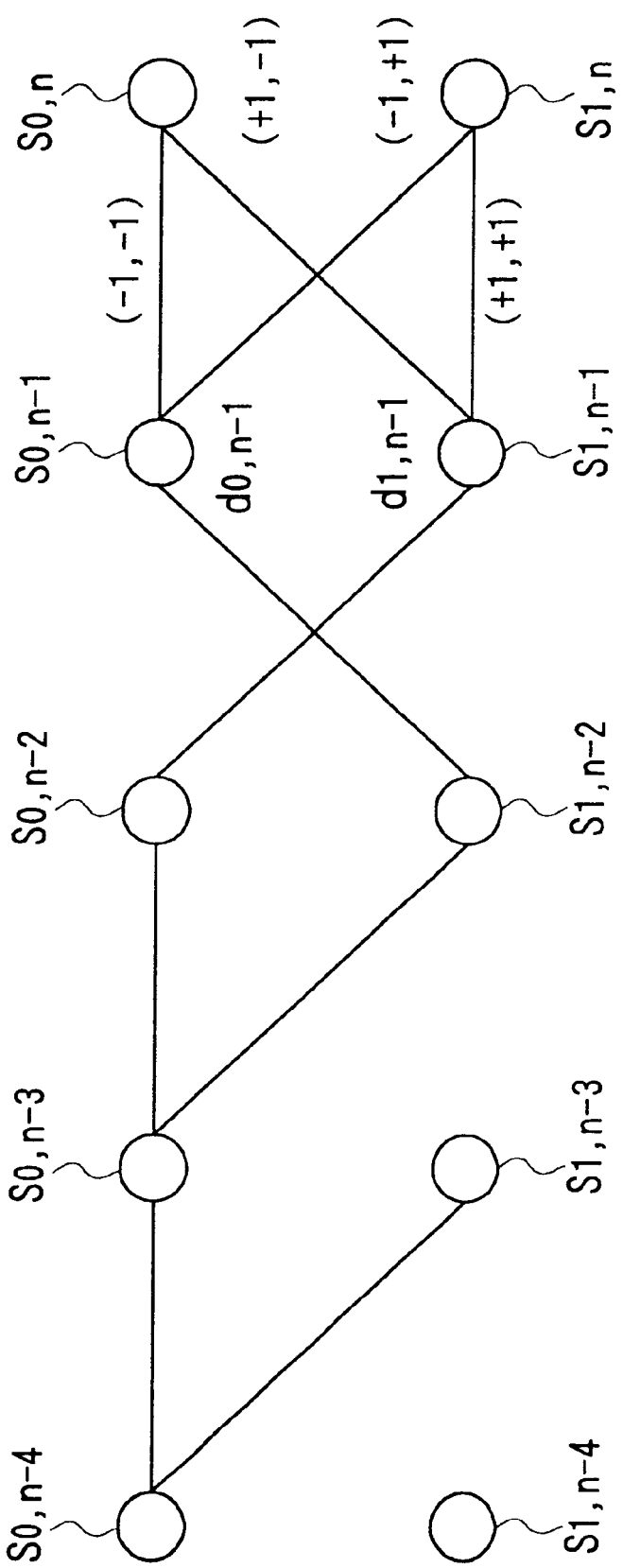
FIG. 15 is a block diagram of the DDFSF in the embodiment of the present invention.

FIG. 2 shows the construction of a second embodiment of the present invention when a DDFSE is used. Referring to the Figure, this embodiment is the same in construction as the preceding first embodiment except for that a DDFSE 203 is used in lieu of the MLSF 103 shown in FIG. 1. The DDFSF can be regarded to have a construction, in which the Viterbi algorithm as shown in FIG. 4 is contracted to one as shown in FIG. 15. While the Viterbi algorithm shown in FIG. 4 is a four-state one, the DDFSE can be realized with a two-state Viterbi algorithm as shown in FIG. 15.

In the case of FIG. 15 only four branches are provided, and thus for the signal estimation branch metrics are generated by using provisional judgment values $d_{0,n-1}$ and $d_{1,n-1}$ in each state which is past behind the preceding one by one symbol. The branch metrics are computed by using the equations (24) to (27). The path metrics are obtained by using the equations (22) and (23). In the estimation of the input signal, like the case of the MLSE, trace-back is executed by comparing the path metrics $S_{0,n}$ and $S_{1,n}$ and selecting the smaller one.

$$S_{0,n} = \min[(S_{0,n-1}+b_{0,n}), (S_{2,n-1}+b_{4,n})] \quad (1)$$

$$S_{1,n} = \min[(S_{0,n-1}+b_{1,n}), (S_{2,n-1}+b_{5,n})] \quad (2)$$

$$S_{2,n} = \min[(S_{1,n-1}+b_{2,n}), (S_{3,n-1}+b_{6,n})] \quad (3)$$

$$S_{3,n} = \min[(S_{1,n-1}+b_{3,n}), (S_{3,n-1}+b_{7,n})] \quad (4)$$

$$b_{0,n} = |r_n - (-h_0 - h_1 - h_2)|^2 \quad (5)$$

$$b_{1,n} = |r_n - (+h_0 - h_1 - h_2)|^2 \quad (6)$$

$$b_{2,n} = |r_n - (+h_0 + h_1 - h_2)|^2 \quad (7)$$

$$b_{3,n} = |r_n - (+h_0 + h_1 - h_2)|^2 \quad (8)$$

$$b_{4,n} = |r_n - (-h_0 - h_1 + h_2)|^2 \quad (9)$$

$$b_{5,n} = |r_n - (+h_0 - h_1 + h_2)|^2 \quad (10)$$

$$b_{6,n} = |r_n - (-h_0 + h_1 + h_2)|^2 \quad (11)$$

$$b_{7,n} = |r_n - (+h_0 + h_1 + h_2)|^2 \quad (12)$$

$$S_{min,n} = \min[S_{0,n}, S_{1,n}, S_{2,n}, S_{3,n}] \quad (13)$$

$$r = |r|e^{j\theta} \quad (14)$$

$$p = |p|e^{j\phi} \quad (15)$$

$$e^{j\Delta\phi} = e^{j(\phi-\theta)} = \frac{r^*}{|r|} \times \frac{p}{|p|} \approx \frac{r^*p}{|r|^2} \quad (16)$$

$$e^{j\Delta\theta} \approx 1 + j\Delta\theta \quad (17)$$

$$\Delta\theta \approx Im[\dot{r}\,p/|r|^2] \quad (18)$$

$$|r|^2\Delta\theta \approx Im[\dot{r}\,p] \quad (19)$$

$$F(z) = \alpha + \frac{\beta}{1-z^{-1}} \quad (20)$$

$$(I'+j'Q)=(I+jQ)e^{j\theta}=(I\cos\theta-Q\sin\theta)+j(I\sin\theta+Q\cos\theta) \quad (21)$$

$$S_{0,n}=\min\lfloor(S_{0,n-1}+b_{0,n}),(S_{1,n-1}+b_{2,n})\rfloor \quad (22)$$

$$S_{1,n}=\min\lfloor(S_{0,n-1}+b_{1,n}),(S_{1,n-1}+b_{3,n})\rfloor \quad (23)$$

$$b_{0,n}=|r_n-(-h_0-h_1+d_{0,n-1}h_2)|^2 \quad (24)$$

$$b_{1,n}=|r_n-(+h_0-h_1+d_{0,n-1}h_2)|^2 \quad (25)$$

$$b_{2,n}=|r_n-(-h_0+h_1+d_{1,n-1}h_2)|^2 \quad (26)$$

$$b_{3,n}=|r_n-(+h_0+h_1+d_{1,n-1}h_2)|^2 \quad (27)$$

As has been described in the foregoing, according to the present invention, in a receiving system using an MLSE or a DDFSE for correcting a received signal for a transmission line distortion in digital data communication, it is possible to obtain stable correction of signal for phase variations due to the frequency off-set or the like even in such a bad receiving environment as to be subject to the generation of an estimation error in an MLSE or a DDFSE.

The reason is as follows. While in a prior art receiving system using an MLSE or a DDFSE the correction for the phase variation is made according to the result of judgment in the MLSE or the DDFSE and the detected phase deviation from the received signal, according to the present invention the detected phase deviation component is amplitude limited to suppress extremely large phase deviations due to the occurrence of errors in the MLSE or the DDFSE, thus evading such an unstable operation as is subject to the dispersion of the phase correction loop.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A signal estimator comprising:
   a phase-synchronized rotating means for rotating the phase of a received signal, a maximum likelihood sequence estimator for estimating the received signal, a replica generating means for generating a replica signal of an input signal to the maximum likelihood sequence estimator, a delaying means for causing delays of the received signal substantially comparable to delays caused in the maximum likelihood sequence estimator and the replica generating means, a phase detecting means for detecting a phase difference between the signal from the delay means and the replica signal from the replica generating means, a low-pass filter and a voltage-controlled oscillating means, the phase rotating means rotating the phase of the received signal according to the output of the voltage-controlled oscillating means, and wherein:

a limiter means is provided between the phase detecting means and the filter, the limiter means being operable to limit the output of the phase detecting means to amplitude limit the phase difference signal obtained from the delayed received signal and the replica signal, thereby suppressing phase deviations to be within a predetermined value;

wherein the limiter means includes:
   an overflow detecting means for detecting an overflow of the input signal;
   an underflow detecting means for detecting an underflow of the input signal; and
   a data correcting means for receiving the input signal and detection signals from the overflow and underflow detecting means;
   the data correcting means outputting a predetermined first value irrespective of the value of the input signal upon detection of the overflow detecting means, and also directly outputting the input signal when neither the overflow nor the underflow is detected by the overflow or underflow detecting means and outputting a predetermined second value irrespective of the value of the input signal upon detection of the underflow by the underflow detecting means.

2. A signal estimator comprising:
   a phase-synchronized rotating means for rotating the phase of a received signal, a maximum likelihood sequence estimator for estimating the received signal, a replica generating means for generating a replica signal of an input signal to the maximum likelihood sequence estimator, a delaying means for causing delays of the received signal substantially comparable to delays caused in the maximum likelihood sequence estimator and the replica generating means, a phase detecting means for detecting a phase difference between the signal from the delay means and the replica signal from the replica generating means, a low-pass filter and a voltage-controlled oscillating means, the phase rotating means rotating the phase of the received signal according to the output of the voltage-controlled oscillating means, and wherein:

a limiter means is provided between the phase detecting means and the filter, the limiter means being operable to limit the output of the phase detecting means to amplitude limit the phase difference signal obtained from the delayed received signal and the replica signal, thereby suppressing phase deviations to be within a predetermined value;

wherein:
   the phase detecting means includes a first multiplying means for obtaining the product of the real part of the output of the delay means and the imaginary part of the output of the replica generating means, and a second multiplying means for obtaining the product of the imaginary part of the output of the delay means and the real part of the output of the replica generating means, and an adding means for adding the products of the two multiplying means.

3. A signal estimator comprising:
   a phase-synchronized rotating means for rotating the phase of a received signal, a delayed decision feedback sequence estimator for estimating the received signal, a replica generating means for generating a replica signal of an input signal to the delayed decision feedback sequence estimator, a delaying means for causing delays of the received signal substantially comparable to delays caused in the delayed decision feedback sequence estimator and the replica generating means, a phase detecting means for detecting a phase difference between the signal from the delay means and the replica signal from the replica generating means, a low-pass filter and a voltage-controlled oscillating means, the phase rotating means rotating the phase of the received signal according to the output of the voltage-controlled oscillating means, and wherein:

a limiter means is provided between the phase detecting means and the filter, the limiter means being operable to limit the output of the phase detecting means to amplitude limit the phase difference signal obtained from the delayed received signal and the replica signal, thereby suppressing phase deviations to be within a predetermined value;

and wherein the limiter means includes:

an overflow detecting means for detecting an overflow of the input signal;

an underflow detecting means for detecting an underflow of the input signal; and a data correcting means for receiving the input signal and detection signals from the overflow and underflow detecting means;

the data correcting means outputting a predetermined first value irrespective of the value of the input signal upon detection of the overflow by the overflow detecting means, and also directly outputting the input signal when neither the overflow nor the underflow is detected by the overflow or underflow detecting means and outputting a predetermined second value irrespective of the value of the input signal upon detection of the underflow by the underflow detecting means.

4. A signal estimator comprising:

a phase-synchronized rotating means for rotating the phase of a received signal, a delayed decision feedback sequence estimator for estimating the received signal, a replica generating means for generating a replica signal of an input signal to the delayed decision feedback sequence estimator, a delaying means for causing delays of the received signal substantially comparable to delays caused in the delayed decision feedback sequence estimator and the replica generating means, a phase detecting means for detecting a phase difference between the signal from the delay means and the replica signal from the replica generating means, a low-pass filter and a voltage-controlled oscillating means, the phase rotating means rotating the phase of the received signal according to the output of the voltage-controlled oscillating means, and wherein:

a limiter means is provided between the phase detecting means and the filter, the limiter means being operable to limit the output of the phase detecting means to amplitude limit the phase difference signal obtained from the delayed received signal and the replica signal, thereby suppressing phase deviations to be within a predetermined value;

and wherein:

the phase detecting means includes a first multiplying means for obtaining the product of the real part of the output of the delay means and the imaginary part of the output of the replica generating means, and a second multiplying means for obtaining the product of the imaginary part of the output of the delay means and the real part of the output of the replica generating means, and an adding means for adding the products of the two multiplying means.

5. A signal estimator for estimating a transmitted signal from a received signal, the signal estimator comprising:

a receiver which receives the received signal;

a phase-synchronized rotator coupled to the receiver, the phase-synchronized rotator receives the received signal from the receiver and rotates the phase of the received signal to produce a rotated received signal;

at least one of a maximum likelihood sequence estimator and a delayed decision feedback sequence estimator coupled to the phase-synchronized rotator, each of the maximum likelihood sequence estimator and the delayed decision feedback sequence estimator produces an estimate of the transmitted signal from the rotated received signal;

a replica generator coupled to the at least one of the maximum likelihood sequence estimator and the delayed decision feedback sequence estimator, the replica generator generates a replica signal of the rotated received signal from the estimate of the transmitted signal;

a delay circuit coupled to the phase rotator, the delay circuit receives the rotated received signal and outputs the rotated received signal with a time delay thereby producing a delayed rotated received signal, the time delay being substantially comparable to delays caused in the at least one of maximum likelihood sequence estimator and the delayed decision feedback sequence estimator and delays caused in the replica generator;

a phase detector coupled to the replica generator and the delay circuit, the phase detector detects a phase difference between the replica signal and the delayed rotated received signal, the phase detector outputs a phase detection signal in response thereto;

a limiter circuit coupled to the phase detector, the limiter circuit receives the phase detection signal and limits the amplitude of the phase detection signal thereby producing a limited phase detection signal, the limiter circuit including:

an overflow detector which analyzes the phase detection signal and produces an overflow signal when the phase detection signal is above a first threshold;

an underflow detector which analyzes the phase detection signal and produces an underflow signal when the phase detection signal is below a second threshold; and a data correcting circuit which receives the phase detection signal and any overflow or underflow signal, the data correcting circuit outputs a first value when the data correcting circuit receives the overflow signal, the data correcting circuit outputs the phase detection signal when neither the overflow signal nor the underflow signal is received, and the data correcting circuit outputs a second value when the data correcting circuit receives the underflow signal;

a filter coupled to the limiter circuit, the filter receives the limited phase detection signal and produces a filtered limited phase detection signal; and a voltage-controlled oscillator coupled to the filter, the voltage-controlled oscillator receives the filtered limited phase detection signal and outputs a control frequency to the phase-synchronized rotator.

* * * * *